United States Patent Office.

WILLIAM N. BLAKEMAN, JR., OF NEW YORK, N. Y.

PIGMENT AND PROCESS OF PRODUCING SAME.

SPECIFICATION forming part of Letters Patent No. 702,177, dated June 10, 1902.

Application filed August 6, 1901. Serial No. 71,093. (No specimens.)

*To all whom it may concern:*

Be it known that I, WILLIAM N. BLAKEMAN, Jr., of the borough of Manhattan, in the city, county, and State of New York, have invented a new and useful Process of Treating Pigments and a new and useful Product Produced by Such Process, which invention is fully set forth in the following specification.

The object of this invention is to treat pigments used in the manufacture of paints in such a manner that when ground in an oil vehicle the paint compound formed will dry quickly without the addition of commercial liquid driers.

In the art of painting it is the usual practice to grind a pigment in an oil vehicle and to add to the compound just prior to spreading it as a paint turpentine-japan or a similar commercial liquid drier.

I have discovered that if a pigment be first treated by combining therewith subacetate of lead and then ground in an oil vehicle the compound formed will exhibit quick-drying properties when spread as a paint without the addition of a commercial liquid drier.

In carrying out my invention I first combine with a pigment (white lead, zinc-white, or other pigment) subacetate of lead, and to accomplish this either the pigment or the subacetate of lead, or both, should be in a liquid or wet condition. The most satisfactory way is to make a solution of the subacetate of lead and then saturate the pigment with this solution, intimately commingling with agitation. I have found the solution of subacetate of lead, known as "Goulard's extract," well suited for use, and in case a small percentage be used water may be added to this to make a sufficient quantity of solution to saturate the pigment. I then evaporate the solvent, leaving the pigment in a dry state, with the subacetate of lead combined with each of its particles. To form a paint compound, I then grind the dry pigment in a suitable oil vehicle, and the paint so produced will dry quickly without the addition of the usual commercial liquid drier.

The proportions of the various ingredients will depend upon the results desired. If two hundred parts of white lead be treated with ten per cent. of lead subacetate, as above described, and then ground in one hundred parts of raw linseed-oil, the paint produced will dry in eight hours without the addition of a commercial liquid drier. If ten per cent. of boiled oil be used in forming the compound, the paint will dry in four hours. If zinc-white be used as the pigment, one hundred parts thereof treated as above described will be found equal in all respects to two hundred parts of white lead, and the paint produced will dry in substantially the same time. The subacetate of lead not only acts as a drier, but also imparts "spreading power" to zinc-white—a quality lacking in this pigment—and even white lead will be found to have additional spreading power after the treatment above described.

As my process and the product produced thereby entirely obviate the necessity for the use of commercial liquid driers now used in painting, it is obvious that a great saving is effected. The small proportion of subacetate-of-lead solution employed is comparatively inexpensive, whereas the cost of the ordinary liquid drier in the proportions now employed is a considerable item in painting.

In my application for patent filed October 31, 1899, Serial No. 735,438, I have claimed, broadly, a process for combining driers with pigments; but in this present application I desire to limit myself to the use of subacetate of lead.

Having thus fully described my invention, I claim—

1. The process herein described, which consists in first combining with a pigment, by the aid of a liquid, subacetate of lead, and then evaporating the liquid before grinding the pigment in oil.

2. The process herein described, which consists in first combining with a pigment, by the aid of a liquid, subacetate of lead; then evaporating the liquid; and then grinding the pigment in oil.

3. The process herein described, which consists in first making a solution of subacetate of lead; then saturating a pigment with said solution; and then evaporating the solvent before grinding the pigment in oil.

4. The process herein described, which consists in first making a solution of subacetate of lead; then saturating a pigment with said solution; then evaporating the solvent; and then grinding the pigment in oil.

5. The process herein described, which consists in first combining with a pigment, by the aid of a liquid, subacetate of lead; then evaporating the liquid; and then grinding the pigment in a vehicle composed of raw oil and boiled oil.

6. The process herein described, which consists in first making a solution of subacetate of lead; then saturating a pigment with this solution; then evaporating the solvent; and then grinding the pigment in a vehicle composed of raw oil and boiled oil.

7. The process herein described, which consists in first combining with a zinc-white pigment, by the aid of a liquid, subacetate of lead; and then evaporating the liquid before grinding the pigment in oil.

8. The process herein described, which consists in first combining with a zinc-white pigment, by the aid of a liquid, subacetate of lead; then evaporating the liquid; and then grinding the pigment in oil.

9. As a new article of manufacture, a dry pigment having subacetate of lead combined therewith.

10. As a new article of manufacture, a dry pigment composed of zinc-white having subacetate of lead combined therewith.

WM. N. BLAKEMAN, JR.

Witnesses:
FRANCIS P. REILLY,
RUDOLPH PRAAST.